United States Patent
Silverman et al.

[11] Patent Number: 6,064,352
[45] Date of Patent: May 16, 2000

[54] COMPOSITE ISOGRID STRUCTURES FOR PARABOLIC SURFACES

[75] Inventors: Edward M. Silverman, Encino; William E. Boyd, Jr., La Crescenta, both of Calif.; Marvin D. Rhodes, Yorktown, Va.; Jack E. Dyer, San Diego, Calif.

[73] Assignees: TRW Inc., Redondo Beach; Composite Optics Inc., San Diego, both of Calif.

[21] Appl. No.: 09/053,187

[22] Filed: Apr. 1, 1998

[51] Int. Cl.[7] .................................................... H01Q 15/16
[52] U.S. Cl. ............................................. 343/912; 343/897
[58] Field of Search .................................... 343/912, 915, 343/916, 840, 897

[56] References Cited

U.S. PATENT DOCUMENTS

| | | | |
|---|---|---|---|
| 3,694,059 | 9/1972 | Shakespeare | 350/310 |
| 3,940,891 | 3/1976 | Slysh | 52/82 |
| 4,439,774 | 3/1984 | Johnson | 343/912 |
| 5,686,930 | 11/1997 | Brydon | 343/912 |

*Primary Examiner*—Don Wong
*Assistant Examiner*—James Clinger
*Attorney, Agent, or Firm*—Michael S. Yatsko

[57] ABSTRACT

The invention relates to high stiffness parabolic structures utilizing integral reinforced grids. The parabolic structures implement the use of isogrid structures which incorporate unique and efficient orthotropic patterns for efficient stiffness and structural stability.

17 Claims, 4 Drawing Sheets

COMPOSITE ISOGRID STRUCTURES FOR PARABOLIC SURFACES

The invention described herein was made in the performance of work under NASA Contract NAS1-19291-1 and is subject to the provisions of Section 305 of the National Aeronautics and Space Act of 1958, as amended (72 Stat. 4.35; 42 U.S.C. 2457).

The invention described herein was jointly made by employees of the United States Government, and it may be manufactured and used by or for the United States Government for United States Government purposes without payment of royalties thereon or therefor.

BACKGROUND OF THE INVENTION

1. Field of the Invention

The present invention relates generally to high stiffness parabolic structures and, more specifically to high stiffness parabolic structures utilizing integral reinforcing grids.

2. Description of the Prior Art

Many spacecraft applications require rigid, low-weight, and thermally stable components. Specifically, current spacecraft antenna applications require high precision reflector contours (RMS 0.010 to 0.0005 inch), low weight, low thermal distortion and therefore, feature a variety of configurations requiring lightweight, thermally stable composite materials. Conventional methods for the fabrication of spacecraft antenna employ the use of a bonded facesheet-to-honeycomb core sandwich construction. The facesheet-to-honeycomb core sandwich construction typically uses a composite facesheet and an aluminum honeycomb core. Space applications which employ the sandwich construct, and experience the extremes of thermal fluctuations, have components which are subject to stress due to the thermal expansion mismatch between the facesheet and core. Further, space applications for reflectors are extremely weight sensitive and therefore, any savings in weight over that present in the typical heavy honeycomb construct is highly desirable.

In addition to thermal expansion mismatch and weight considerations, the facesheet-to-honeycomb sandwich construction has a core of constant thickness measured perpendicular to the reflector surface and, as the honeycomb core becomes Thicker relative to the curvature of the paraboloid, the back surface facesheet gets distinctly different from the front surface facesheet. The result is a front facesheet which is generally parabolic in shape and a back facesheet which is non-parabolic in shape. The difference in shape between the front and back facesheets requires each facesheet to be fabricated with different specifications.

While various designs, like that disclosed in U.S. Pat. No. 3,940,891, have been used to satisfy high rigidity, low weight requirements for space application components and structures which are flat or singly curved in shape, applications related to parabolic antenna reflectors and similar doubly curved structures have not been addressed.

Based on techniques known in the art for the construction of antenna reflectors and similarly doubly curved structures, a composite isogrid structure for parabolic surfaces is highly desirable.

SUMMARY OF THE INVENTION

It is an aspect of the present invention to provide a high stiffness parabolic structure utilizing an integral reinforcing grid which includes a first structure having a generally parabolic shape; and a second structure having a generally parabolic shape where the second structure is formed in a triangular isogrid pattern and is disposed adjacent to the first structure.

It is also an aspect of the present invention to provide a high stiffness parabolic structure utilizing an integral reinforcing grid which includes a skin facesheet having a generally parabolic shape; and a grid attached to the skin facesheet and having a triangular isogrid pattern.

Optionally, the parabolic structure disclosed in this invention may be constructed with a third structure, a skin backsheet. The skin backsheet may be formed as a continuous skin backsheet and may also be formed as a flanged skin backsheet containing a triangular isogrid pattern coincident with the triangular isogrid pattern of the second grid structure.

BRIEF DESCRIPTION OF THE DRAWINGS

Reference is now made to the following specification and attached drawings, wherein.

DETAILED DESCRIPTION OF THE INVENTION

As previously mentioned, the present invention relates generally to parabolic isogrid structures and, specifically to an improvement in the fabrication of conventional antenna reflectors. Present spacecraft antenna reflector applications require high precision reflector contours, low thermal distortion and are extremely weight critical.

New composite fabrication techniques employing new design concepts and new materials are needed to reduce weight, increase stiffness, provide greater dimensional stability and to reduce cost to satisfy future missions. A reflector based on an isogrid construction offers potential for weight savings in addition to greater stiffness and stability compared to conventional honeycomb sandwich designs and is therefore highly desirable.

Figure 1:
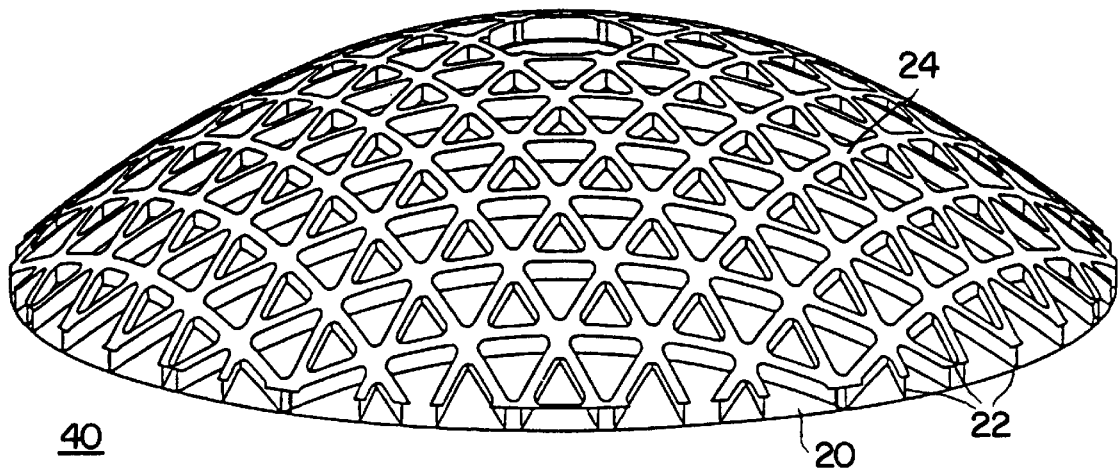
FIG. 1 is an illustration of a high stiffness parabolic antenna reflector which utilizes an integral flanged reinforcing grid in accordance with the present invention.

The following preferred embodiment illustrates a parabolic isogrid reflector 40 which includes a skin facesheet 20 having a generally parabolic shape, a plurality of upstanding integral ribs 22 which form an isogrid structure, and an optional flanged skin backsheet 24, as illustrated in FIG. 1. It should be understood, however, by those of ordinary skill in the art that the principles of the present invention are applicable to many types of paraboloid structures requiring high stiffness to weight ratios and reduced production costs.

Figure 2:
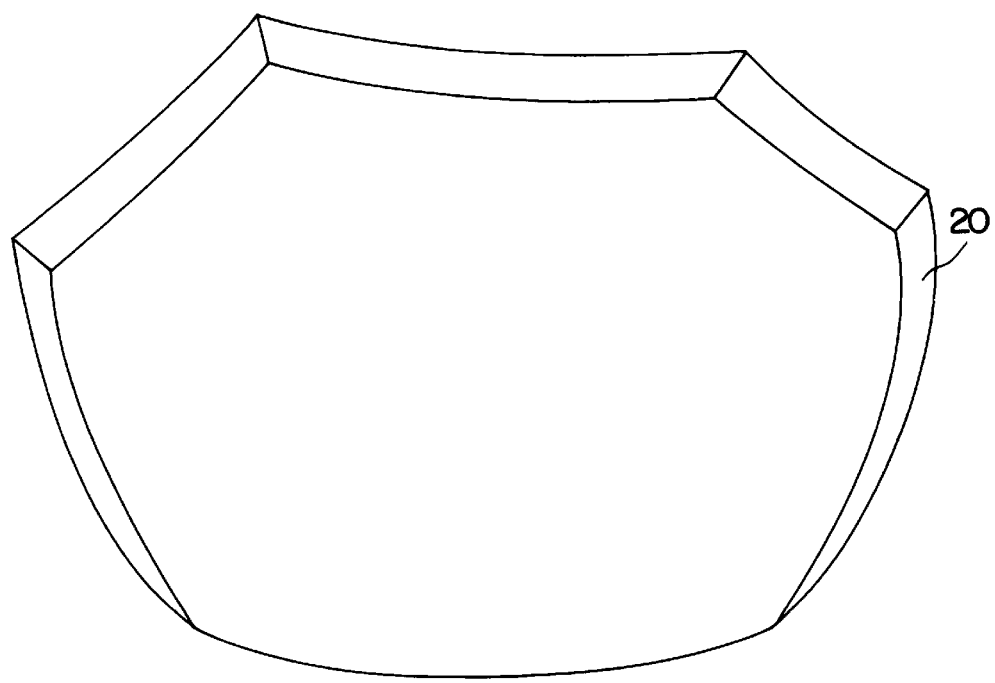
FIG. 2 is a front view illustration of a skin facesheet in accordance with the present invention.
Figure 3:
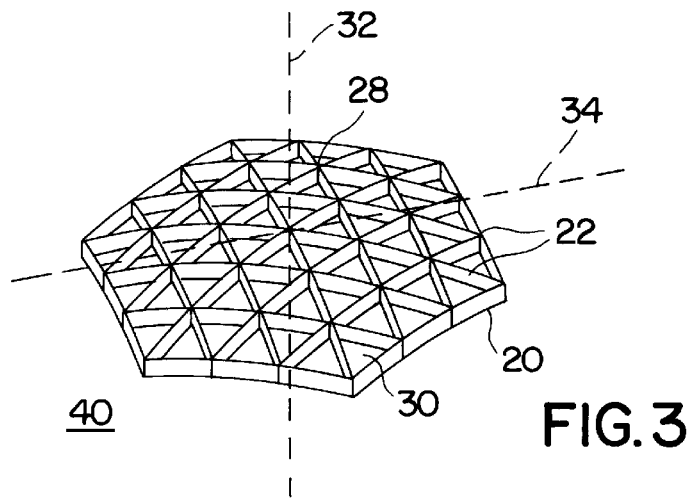
FIG. 3 is an isometric illustration of a high stiffness parabolic antenna reflector having an open grid construction in accordance with the present invention.
Figure 4:
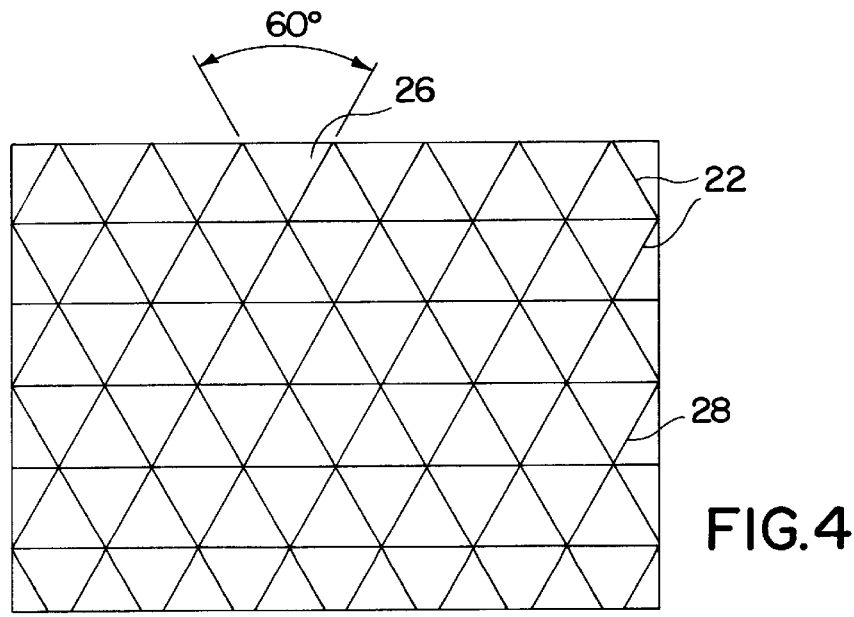
FIG. 4 is an illustration of a triangular isogrid pattern in accordance with the present invention.

For illustration, the parabolic isogrid reflector 40 is described and illustrated further in FIGS. 1 through 9, beginning with a skin facesheet 20, as shown in FIG. 2. The skin facesheet 20, which is generally parabolic in shape, defines the front surface of the parabolic reflector and provides a structure on which to integrate a reinforcing isogrid structure. As illustrated in FIG. 3, a plurality of ribs 22 are interlocked and edge bonded to the skin facesheet 20 to form an isogrid structure, further referenced as a grid 28. The grid 28, as detailed in FIG. 4, is an integral stiffened waffle with a pattern of approximately 60° triangles 26.

The grid 28 provides reinforcement to the skin face sheet 20, by a series of interlocked triangles 26. Individual triangular members 26 of the grid structure 28 each have a moment of inertia to bending characteristic (i.e. resistance to twisting/bending) and the stiffness of the grid 28 is the aggregate resistance to twist of its individual triangular members 26. Therefore, a high resistance to bending of the individual triangular members 26 provides a high resistance to bending of the entire grid structure 28.

Figure 5:
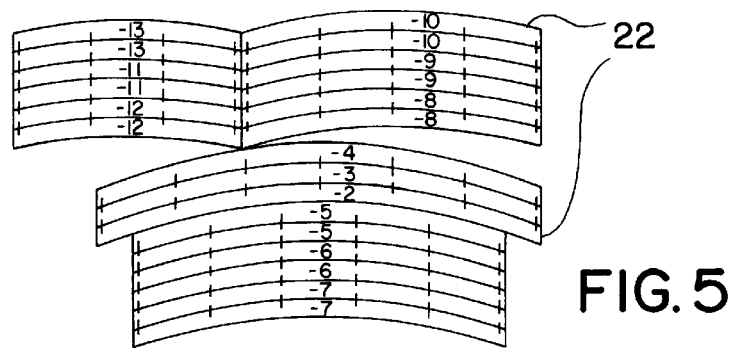
FIG. 5 is an illustration of ribs used to construct a reinforcing triangular isogrid structure in accordance with the present invention.
Figure 6:
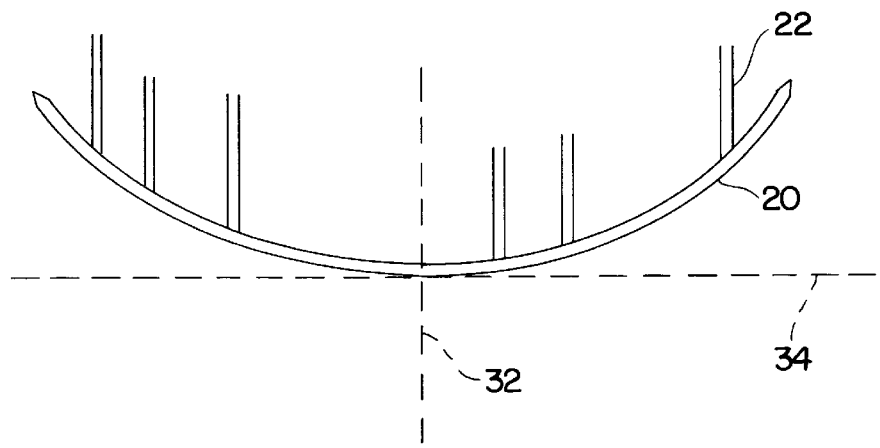
FIG. 6 is an illustration of the parallel orientation of the ribs to the focal axis of a skin facesheet in accordance with the present invention.

As previously mentioned, the grid 28 is formed from a plurality of interlocking ribs 22. Each rib 22, as illustrated in FIG. 5, is cut from flat laminate, slotted and interlocked to form an isogrid structure. A key characteristic, as illustrated in FIGS. 3 and 6, is that each rib 22 is cut from a plane which is then oriented parallel to the focal axis 32 of the skin facesheet 20 where the planes of the ribs 22 intersect a plane 34 tangent to the vertex of the skin facesheet paraboloid in an isogrid pattern. Using analytical geometry, it can be shown that the intersection of a paraboloid and any plane parallel to the focal axis will be a parabolic line having the same focal length as the paraboloid. Thus, all ribs 22 have the same curvature and each individual rib is cut from a similar portion of the parabolic curve. The benefit is that the ribs 22 can all be cut at one time from tacked laminate, trimmed to length and slotted later, resulting in significant production savings.

To further maintain a low weight parabolic structure and, for the purposes of the preferred embodiment, the skin facesheet 20 and grid 28 are formed from a light weight graphite composite material. It is further noted that the rib construction is not restricted to ribs with constant depth. Ribs which taper in depth from the center to the edge of the reflector can be implemented by fabricating the skin backsheet 24 on a second mold with a different parabolic focal length than that of the skin facesheet 20. Similarly, the reflector design can be used on offset reflectors, with either constant depth or tapered ribs.

Figure 7:
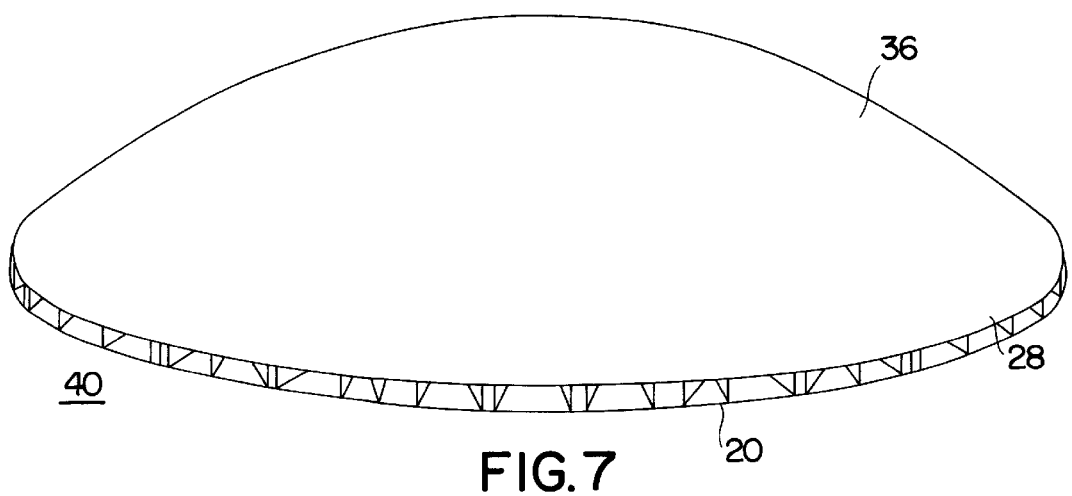
FIG. 7 is an illustration of a high stiffness parabolic antenna reflector having a closed skin backsheet construction in accordance with the present invention.

The back surface of the parabolic reflector 40 may be formed with an open grid construction, as illustrated in FIG. 3 or may also be formed with a flanged or closed construction as illustrated, respectively, in FIGS. 1 and 7. The parabolic reflector 40 is constructed with a closed or flanged construction by utilizing a generally parabolically shaped skin backsheet, preferably formed of a graphite composite material. The skin backsheet is bonded to a reinforcing grid, where the reinforcing grid is sandwiched between a skin facesheet and the skin backsheet.

Figure 8A:
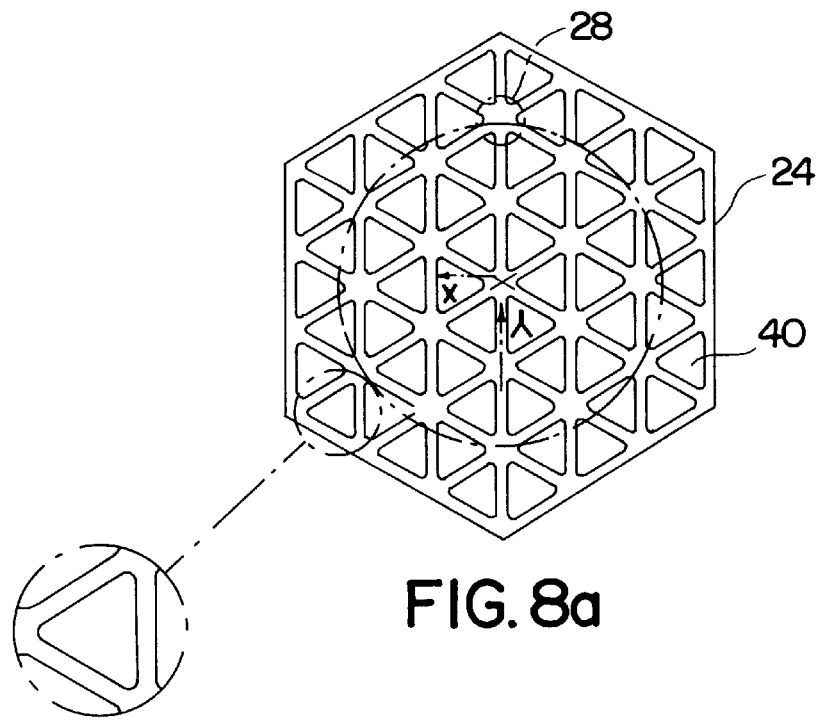
FIG. 8a is an illustration of a flanged skin backsheet having an triangular isogrid cut out pattern in accordance with the present invention.
Figure 8B:
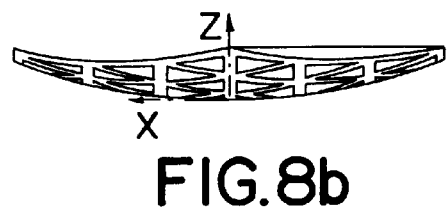
FIG. 8b is a side view illustration of a flanged skin backsheet having a triangular isogrid cut out pattern in accordance with the present invention.
Figure 9:
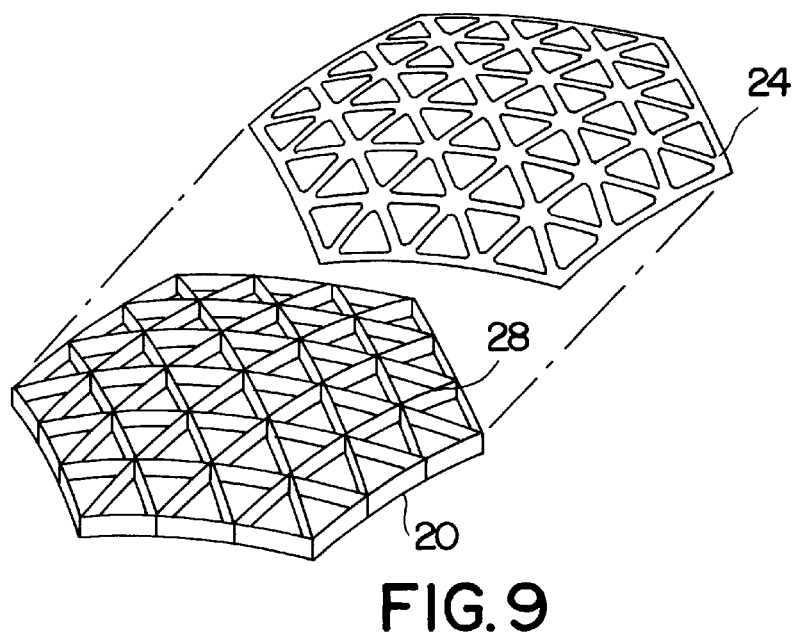
FIG. 9 is an isometric illustration of isogrid reinforced skin facesheet and a skin backsheet with an isogrid pattern coincident with the pattern of a reinforcing grid structure in accordance with the present invention.

A flanged skin backsheet 24, as illustrated in FIG. 1, has several advantages, including providing structural continuity over the slots at the rib intersections and reinforcing the ribs against buckling while reducing the overall thickness of the reflector and, providing additional structural reinforcement to the reflector while not contributing significantly to the overall weight of the parabolic reflector. As illustrated in FIGS. 8a and 8b, the flange skin backsheet 24 is constructed having an isogrid pattern which i s formed by removing triangular sections 40 of the skin backsheet 24. The isogrid pattern formed from the flange skin backsheet 24 is coincident with the triangular isogrid pattern formed from the grid 28, as illustrated in FIG. 9.

A closed skin backsheet 36 is illustrated in FIG. 7 and is formed as a solid backsheet.

Construction of the closed 36 or flanged skin backsheet 24 is accomplished using a second shell fabricated identically to the shell forming the reflector skin facesheet 20, and built on the same mold as the skin facesheet 20. Because of the orientation of the ribs 22 parallel to the focal axis of the skin facesheet 20, the skin facesheet 20 and the skin backsheet (24, 36) are both paraboloids having the generally the same focal length. Therefore, an identical mold can be used to fabricate the facesheet 20 and backsheet (24, 36) resulting in reduced fabrication complexity and costs as compared to conventional constructions.

Finally, due to its stiffer geometry, isogrid has an inherent weight efficiency which makes it a potentially attractive alternative to sandwich construction for lightweight spacecraft structures. As previously described, the weight savings in an isogrid reflector arises from replacing the honeycomb core and back facesheet with a lighter lattice of interlocked ribs so that the isogrid reflector structure has equivalent stiffness. It is also important to note that the same principles which apply to the construction of the parabolic reflectors may also be applied to other doubly curved structures which require similarly high stiffness to weight ratios, thermal expansion compatibility, and low production cost considerations.

Obviously, many modifications and variations of the present invention are possible in light of the above teachings. Thus, it is to be understood that, within the scope of the appended claims, the invention may be practiced otherwise than as specifically described above.

What is claimed is:

1. A reflector comprising:

a first structure having a generally parabolic shape; and a second structure having a generally parabolic shape, said second structure being formed in a first triangle isogrid pattern and being disposed adjacent to said first structure, said first isogrid pattern being formed from a plurality of ribs, each of said ribs containing at least one interlocking slot with said slot being located at rib intersections to form said first triangular isogrid pattern, each of said ribs extending away from said first structure, each of said ribs being integral with said first structure, and each of said ribs configured such that a plane of each said rib is oriented parallel to a focal axis of said first structure.

2. The reflector as recited in claim 1, wherein said first structure is formed of a graphite composite material.

3. The reflector as recited in claim 1, wherein said first triangular isogrid pattern is formed from a plurality of triangular elements where an interior angle of each said triangular element is approximately 60°.

4. The reflector as recited in claim 1, wherein said second structure is formed of a graphite composite material.

5. The reflector as recited in claim 1, further comprising a third structure having a generally parabolic shape, wherein said third structure is disposed adjacent to said second structure.

6. The reflector as recited in claim 5, wherein said third structure is formed of a graphite composite material.

7. The reflector as recited in claim 5, wherein said third structure contains a second triangular isogrid pattern coincident with said first triangular isogrid pattern.

8. The reflector as recited in claim 5, wherein said second structure is disposed between said first structure and said third structure.

9. A parabolic reflector comprising:

a skin facesheet having a generally parabolic shape; and a grid attached to said skin facesheet and having a first triangular isogrid pattern, said grid being formed from a plurality of ribs, each of said ribs containing at least one interlocking slot with said slot being located at rib intersections to form said first triangular isogrid pattern, each of said ribs extending away from said skin facesheet, each of said ribs being integral with said facesheet and each of said ribs configured such that a plane of each said rib is oriented parallel to a focal axis of said skin facesheet.

10. The parabolic reflector as recited in claim 9, wherein said skin facesheet is formed from a graphite composite material.

11. The parabolic reflector as recited in claim 9, wherein said first triangular isogrid pattern is formed of a plurality of triangular elements where an interior angle of each said triangular element is approximately 60°.

12. The parabolic reflector as recited in claim 9, wherein said grid is formed from a graphite composite material.

13. The parabolic reflector as recited in claim 9, further comprising a skin backsheet having a generally parabolic shape and attached to said grid.

14. The parabolic reflector as recited in claim 13, wherein said skin backsheet is formed from a graphite composite material.

15. The parabolic reflector as recited in claim 13, wherein said grid is disposed between said skin facesheet and said skin backsheet.

16. The parabolic reflector as recited in claim 13, wherein said skin backsheet is a flange backsheet.

17. The parabolic reflector as recited in claim 16, wherein said flange backsheet contains a second triangular isogrid pattern coincident with said first triangular isogrid pattern.

* * * * *

UNITED STATES PATENT AND TRADEMARK OFFICE
CERTIFICATE OF CORRECTION

PATENT NO. : 6,064,352
DATED : May 16, 2000
INVENTOR(S) : Edward M. Silverman, William E. Boyd, Jr., Marvin D. Rhodes, and Jack E. Dyer It is certified that error appears in the above-identified patent and that said Letters Patent is hereby corrected as shown below:

On title page, item 73 Assignee
replace "TRW Inc., Redondo Beach; Composite Optics, Inc; San Diego, both of Calif."

with --TRW Inc., Redondo Beach, CA; National Aeronautics and Space Administration, Hampton, VA; Composite Optics, Inc., San Diego, CA.--

Signed and Sealed this

Twenty-second Day of May, 2001

*Attest:*

NICHOLAS P. GODICI

*Attesting Officer*  *Acting Director of the United States Patent and Trademark Office*